United States Patent
Li

(10) Patent No.: US 11,706,496 B2
(45) Date of Patent: Jul. 18, 2023

(54) ECHO BULLET SCREEN

(71) Applicant: Shanghai Bilibili Technology Co., Ltd., Shanghai (CN)

(72) Inventor: Yangkun Li, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 16/455,377

(22) Filed: Jun. 27, 2019

(65) Prior Publication Data

US 2020/0007940 A1  Jan. 2, 2020

(30) Foreign Application Priority Data

Jun. 29, 2018  (CN) .......................... 201810694734.2

(51) Int. Cl.
| | |
|---|---|
| *H04N 21/4788* | (2011.01) |
| *H04N 21/431* | (2011.01) |
| *H04N 21/81* | (2011.01) |
| *H04N 21/8545* | (2011.01) |

(52) U.S. Cl.
CPC ..... *H04N 21/4788* (2013.01); *H04N 21/4316* (2013.01); *H04N 21/8173* (2013.01); *H04N 21/8545* (2013.01)

(58) Field of Classification Search
CPC .......................... H04N 21/2552; H04N 21/235
See application file for complete search history.

(56) References Cited

U.S. PATENT DOCUMENTS

| | | | | |
|---|---|---|---|---|
| 8,005,679 | B2* | 8/2011 | Jordan | H04N 21/4221 |
| | | | | 704/270.1 |
| 10,715,881 | B2* | 7/2020 | Qu | H04N 21/4756 |
| 11,206,235 | B1* | 12/2021 | Sarkar | H04L 51/10 |
| 2011/0167360 | A1* | 7/2011 | Aitken | G06F 3/04883 |
| | | | | 715/760 |
| 2015/0213839 | A1* | 7/2015 | Woodman | H04L 65/607 |
| | | | | 386/248 |
| 2015/0358584 | A1* | 12/2015 | Mattson | G06F 3/04842 |
| | | | | 348/14.08 |
| 2018/0167692 | A1* | 6/2018 | Kedenburg, III | H04N 21/466 |
| 2018/0192142 | A1* | 7/2018 | Paul | H04N 21/2187 |

(Continued)

FOREIGN PATENT DOCUMENTS

| | | |
|---|---|---|
| CN | 103414943 A | 11/2013 |
| CN | 104735543 A | 6/2015 |

(Continued)

*Primary Examiner* — Mushfikh I Alam
(74) *Attorney, Agent, or Firm* — BakerHostetler

(57) ABSTRACT

Techniques for displaying comments relative to video frames are described herein. The disclosed techniques include sending message data comprising a comment on a video item by a first client computing device when the first client computing device is in a first state among a plurality of states; receiving bullet screen data comprising comments on the video item sent by the first client computing device and other client computing devices; determining echo bullet screens comprising a plurality of comments on the video item sent by the other client computing devices during a predetermined period; and displaying a bullet screen comprising the comment sent by the first client computing device and the echo bullet screens.

17 Claims, 5 Drawing Sheets

(56) References Cited

U.S. PATENT DOCUMENTS

| | | | |
|---|---|---|---|
| 2018/0203577 A1* | 7/2018 | Astavans | H04N 7/147 |
| 2019/0087151 A1* | 3/2019 | Systrom | H04N 21/233 |
| 2019/0132275 A1* | 5/2019 | Kelly | H04L 65/611 |
| 2019/0141402 A1* | 5/2019 | Cornell | G06F 3/0483 |
| 2022/0053233 A1* | 2/2022 | Baxter | H04N 21/4725 |

FOREIGN PATENT DOCUMENTS

| | | | |
|---|---|---|---|
| CN | 106060593 A | 10/2016 | |
| CN | 106375865 A | 2/2017 | |
| CN | 107071506 A | 8/2017 | |
| CN | 107592578 A | 1/2018 | |
| CN | 107645686 A | 1/2018 | |
| CN | 107682750 A | 2/2018 | |

\* cited by examiner

ECHO BULLET SCREEN

CROSS-REFERENCE TO RELATED APPLICATION

The present application claims priority of Chinese patent application No. 201810694734.2, filed on Jun. 29, 2018. The entire disclosure of the above-identified application is hereby incorporated by reference herein and made a part of this specification.

BACKGROUND

Users may attempt to access conventional social media on their devices to communicate about interesting content. Using conventional social media may be cumbersome as users may have to switch back and forth between different applications to access the content of interest and social media related to the content. As communication devices, such as mobile phones, become more sophisticated, people continue to discover new ways to communicate.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION OF ILLUSTRATIVE EMBODIMENTS

Figure 1:
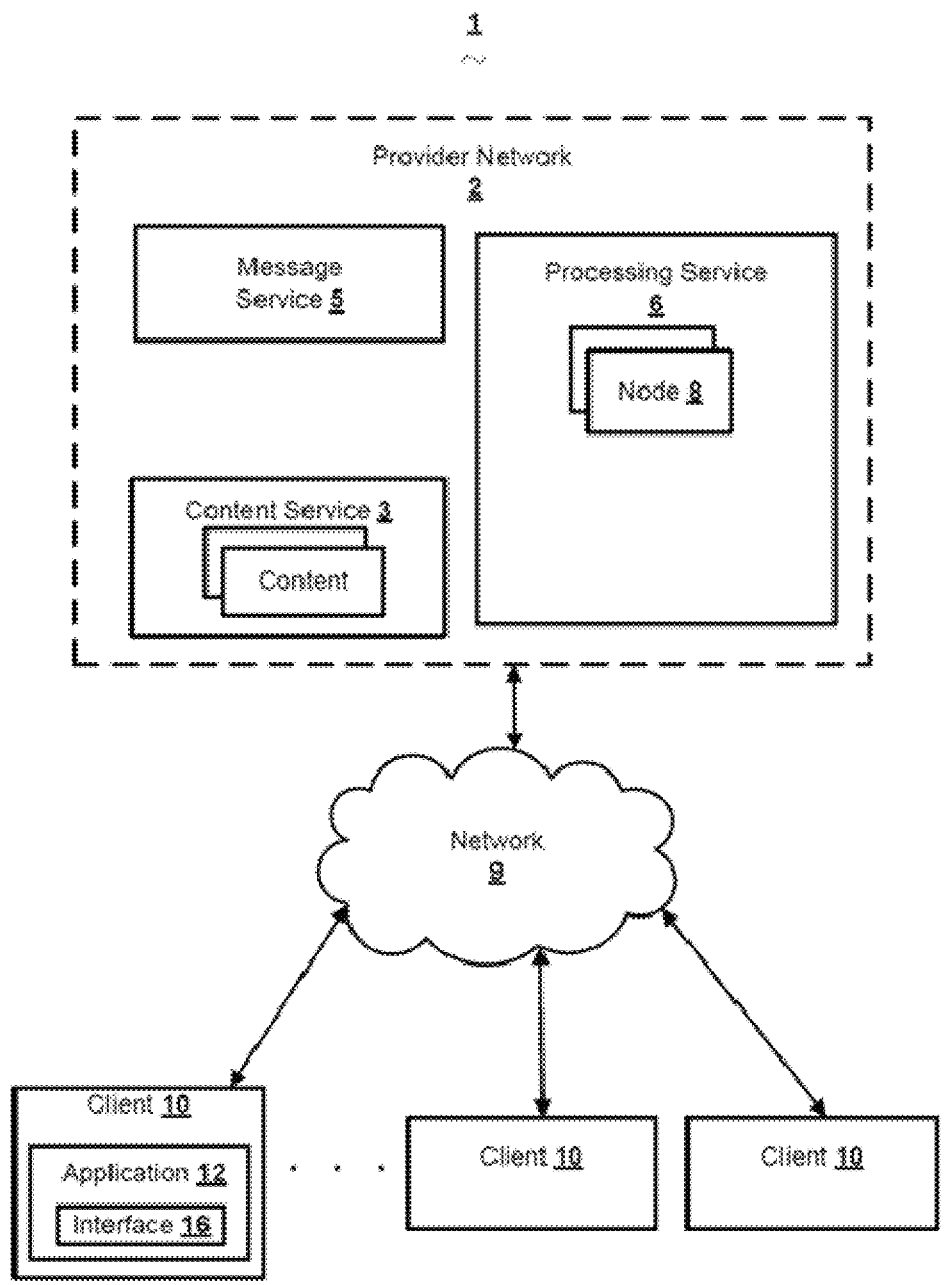
FIG. 1 is a schematic diagram illustrating an example system that may be used in accordance with the present disclosure.

FIG. 1 is a schematic diagram showing an example system 1 that may be used in accordance with the present disclosure. The system 1 may comprise a provider network 2 and a plurality of client devices 10. The provider network 2 and the plurality of client devices 10 may communicate with each other via one or more networks 9.

In some embodiments, the content service 3 may be implemented as part of the provider network 2. In other embodiments, the content service 3 may be managed by a separate service provider than a service provider of the provider network 2. It should also be understood that the provider network 2 may provide additional content services separate from the content service 5.

The content service 3 may comprise a content streaming service, such as an Internet protocol video streaming service. The content streaming service may be configured to distribute content via a variety of transmission techniques. The content service 3 may be configured to provide the content, such as video, audio, textual data, a combination thereof, and/or the like. The content may comprise content streams (e.g., video stream, audio stream, information stream), content files (e.g., video file, audio file, text file), and/or other data. The content may comprise gaming content. For example, the content service 5 may comprise a collaborative gaming platform, a video sharing service, a video hosting platform, a content distribution platform, and/or the like.

The provider network 2 may implement a commentary service configured to allow users to comment and/or share comments associated with content. The comments may be displayed with the content on the same screen. For example, the comments may be displayed in an overlay above the content. The comments may be encoded into a format of the content. For example, the comments may be encoded as video content as the original content. The comments may be animated when displayed. For example, the comments may be shown scrolling (e.g., from right to left, left to right, top to bottom, bottom to top) across the content, which may be referred to as "bullet screens."

The provider network 2 may be located at a data center, such as a single premise, or be distributed throughout different geographic locations (e.g., at several premises). The provider network 2 may provide the services via the one or more networks 9. The networks 9 comprise a variety of network devices, such as routers, switches, multiplexers, hubs, modems, bridges, repeaters, firewalls, proxy devices, and/or the like. The networks 9 may comprise physical links, such as coaxial cable links, twisted pair cable links, fiber optic links, a combination thereof, and/or the like. The networks 9 may comprise wireless links, such as cellular links, satellite links, Wi-Fi links and/or the like.

The provider network 2 may comprise a message service 5. The message service 5 may be configured to receive a plurality of messages. The plurality of messages may comprise a plurality of comments associated with content and information related to the plurality of comments. The plurality of messages may be associated with a particular content item, content session, and/or the like.

The message service 5 may be configured to manage messages for various content items. Users may browse content and access different content items to view comments for particular content, such as comments posted by other users for that particular content. Comments from users associated with a particular content item may be output to other users watching the particular content item. For example, all users accessing a content item (e.g., video clip) may view comments associated with the content item. Comments that are input may be output in real-time or near-real-time.

The message service 5 may be configured to process the plurality of messages. The message service 5 may implement a queue or otherwise prioritize processing of the plurality messages based on information, e.g., time stamps, incremented identifier, associated with corresponding comments. The message service 5 may be configured to process the plurality of messages using load balancing. For example, the message service 5 may be configured to use one or more of the plurality of processing nodes to process the messages, prioritize the messages, load balance the messages, and/or the like. The message service 5 may store, at least temporarily, the plurality of messages. The message service 5 may store the messages in a datastore, such as a database.

The message service 5 may be configured to process a message by performing a grouping process. The grouping process may comprise grouping messages based on a characteristic. If two messages have the same characteristic or are within a threshold range of a characteristic, then the messages may be grouped. Messages associated with a particular content item (e.g., stream, file, show, movie, song, game session) may be associated with the same group. For example, a message may comprise or be associated with a content identifier. The content identifier may uniquely identify the content item. The message service 5 may associate a message with a group associated with the content item if the content identifier is found in the message or otherwise associated with the message (e.g., sent separately).

The message service 5 may perform natural language processing, topic recognition, pattern recognition, artificial intelligence, and/or the like to automatically determine characteristics of the messages and/or group the messages. As an example, frequently occurring phrases or patterns may be identified as topics. As another example, a database of topics associated with content may be maintained. The topics may include genres (e.g., action, drama, comedy), personalities (e.g., actors, actresses, directors), languages, and/or the like. Messages may be grouped based on characteristics of the client device and/or users sending the messages. Demographics, interests, history, and/or like may be stored for a plurality of users to determine potential groupings of messages.

The message service 5 may be configured to process messages by determining contexts for outputting (e.g., displaying, presenting) comments comprised in the messages. The context may comprise a context for outputting a comment based on the grouping. The context may comprise a time context associated with a time to output the comment.

A message may indicate a time when a comment was input by a user. The time may comprise a time internal to the content item or other similar information, such as fragment identifiers. For example, the time may indicate a portion of the content item (e.g., one or more content fragments) that was viewed by a user when the user input a comment. The time may indicate when a user started inputting the comment, a duration of inputting, a time when the input was submitted, and/or the like.

The message service 5 may determine to output a comment during or close to the portion of content item being commented. In an example, if multiple messages are received for a portion of time (e.g., a scene), then a time offset may be added to some of the messages to prevent all of corresponding comments from being output at the same time.

The context may further comprise a graphical context associated with a form of the comment. The graphical context may comprise a size, a color, a font, and/or the like. The context may comprise a moving context in which the comment moves when output. The moving context may comprise an animation. For example, the moving context may comprise a direction of movement (e.g., left to right, right to left, up to down, down to up, diagonally). The moving context may comprise any type of animation, such as a spinning motion, a waving motion, a zig-zag, a circular motion, increasing in size, decreasing in size, and/or the like.

The context may be determined based on a preference associated with a message. For example, a user may specify a preference for how a corresponding comment is to be output. The user may specify the context for a particular comment. The context may be determined based on a characteristic of a particular content item. For example, the graphical context may be determined based on the background color of the content item during a particular segment. The graphical context may contrast with the background color of the content item.

The message service 5 may be further configured to process a message by generating output data. The output data may comprise instructions for implementing outputting a comment based on corresponding context. The output data may comprise application data for instructing an application to overlay the comment based on the context. The output data may comprise instructions for generating (e.g., encoding) content corresponding to a comment.

The output data may be used to generate (e.g., encode) output commentary content, such as an output content stream. The output commentary content may be combined (e.g., multiplexed) with original content item such as the content provided by the content service 3. The resulting combination may comprise content in a single package (e.g., container, transport container, transport stream). The package may comprise the original content item along with the output commentary content (e.g., displayed on top of the original content item).

The message service 5 may be further configured to process messages by performing a screening process. The screening process may comprise rejecting or flagging messages that match screening criteria. The screening criteria may specify terms and/or phrases, such as profanity, hate speech, indecent language, and/or the like. The screening criteria may specify characters, such as symbols, fonts, and/or the like. The screening criteria may specify languages, computer readable code patterns, and/or the like.

The provider network 2 may further comprise a processing service 6. The processing service 6 may be configured to provide processing for a variety of services, such as the services of the provider network 2. The processing service 6 may comprise a plurality of processing nodes 8 (e.g., as a service). The plurality of processing nodes 8 may process tasks associated with a message service 5. The plurality of processing nodes 8 may be implemented as one or more computing devices, one or more processors, one or more virtual computing instances, a combination thereof, and/or the like.

The plurality of processing nodes 8 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

The plurality of processing nodes 8 may comprise nodes associated with providing specific services (e.g., processing tasks). The nodes may be dedicated to providing these specific services. For example, the plurality of processing nodes 8 may implement a receiver, a content generator, a combiner, a transcoder, a combination thereof.

In some embodiments, the plurality of processing nodes 8 may process events submitted by the plurality of client computing devices. The events may be associated with discussing real-time news, videos, social hot topics, reports against certain user accounts, and/or the like. In other embodiments, the plurality of processing nodes 8 may process performance evaluation for a plurality of user account who review events in the network community. In some implementations, these services may be implemented as dedicated computing devices, dedicated processors, dedicated virtual machine instances, and/or the like. In other implementations, a variety of different nodes may implement any of the functions associated with these services.

The plurality of client devices 10 may be configured to access the content and the services of the provider network 2. The plurality of client devices 10 may comprise any type of computing device, such as a mobile device, a tablet device, laptop, a computing station, a smart device (e.g., smart apparel, smart watch, smart speaker, smart glasses), a virtual reality headset, a gaming device, a set top box, digital streaming device, robot, a vehicle terminal, a smart TV, a TV box, an e-book reader, MP3 (Moving Picture Experts Group Audio Layer III) players, MP4 (Moving Picture Experts Group Audio Layer IV) players, and so on.

The plurality of client devices 10 may be associated with one or more users. A single user may use one or more of the plurality of client devices 10 to access the provider network 2. The plurality of client devices 10 may travel to a variety of locations and use different networks to access the provider network 2.

An example client device 10 may comprise an application 12. The application 12 outputs (e.g., display, render, present) content to a user. The content may comprise videos, audio, comments, textual data and/or the like. The application 12 may also provide a menu for navigating a variety of content.

The client device 10 may access an interface 16 that allows users to provide comments associated with corresponding content and submit events to a processing service. The interface 16 may comprise an input element. For example, the input element may be configured to receive input from a user, such as comments associated with a particular content, events, user accounts, and/or the like. In some embodiments, the interface 16 may be implemented as part of the application 12.

The application 12 may allow a user to set a context (e.g., color, font size, animation, emoji, scrolling direction) associated with his or her input. The application 132 may determine (e.g., automatically) other context information, such as timing information (e.g., start time, duration, end time for the input). The application 12 may send the input, the context, the context information, and/or other information to the message service 5 of the provider network 2.

The application 12 may also send events to a processing service. As an example, the application 12 may send reports against certain users to a processing service, and the application 12 may also send reviews about the reports to the processing service. The events or reviews sent from the plurality of client computing devices comprise reasons of submitting the events, content attributes associated with the events, user account information, and/or the like. The techniques for processing events and evaluating performance of a plurality of user accounts in accordance with the present disclosure can be implemented by the example system as shown in FIG. 1.

Figure 2:
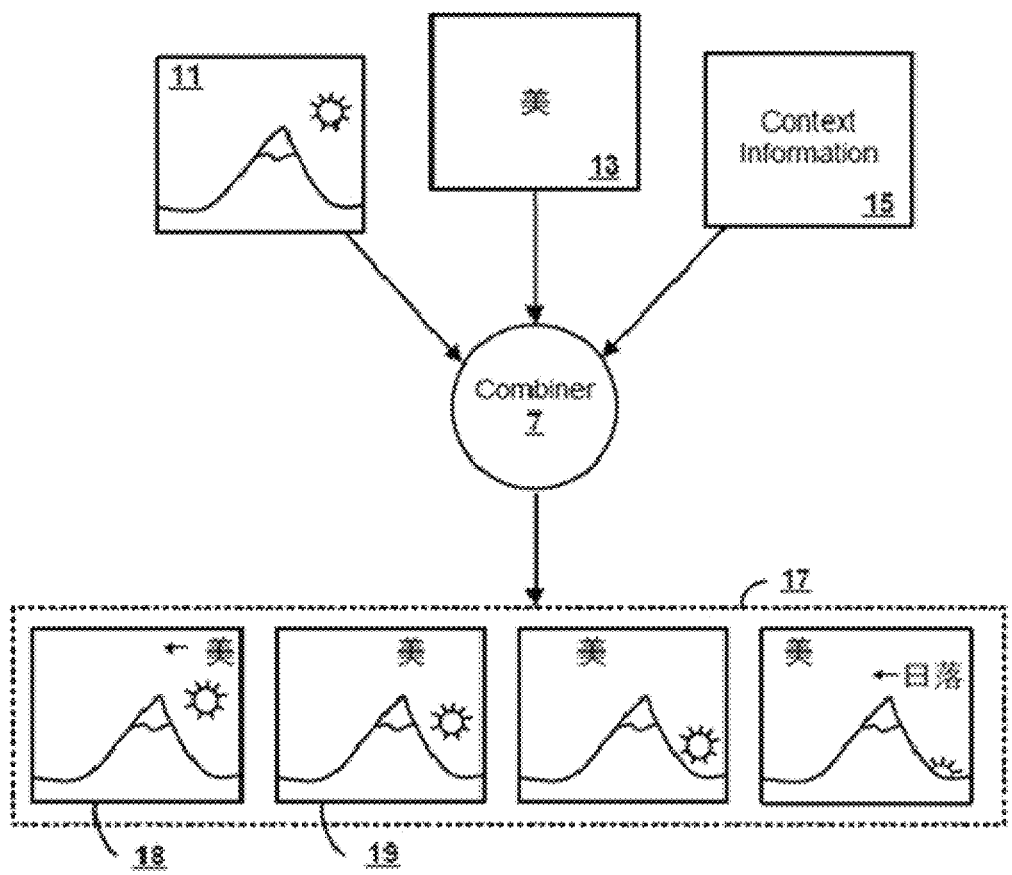
FIG. 2 is a schematic diagram illustrating an example process for combining content that may be used in accordance with the present disclosure.

FIG. 2 is a schematic diagram showing an example process for combining content. A combiner 7 may be configured to receive content 11. As illustrated in this example, the content 11 may comprise a video. It should be understood that other content may be used. The content 11 may comprise a plurality of frames, such as a series of images. The plurality of frames may be time ordered. For example, a first frame maybe ordered before a second frame.

The combiner 7 may be implemented by any of the services and/or devices described herein. For example, the combiner 7 may be implemented by the processing service 6 or the message service 5 of the provider network 2. In other examples, the combiner 7 may be implemented by the application 12 of the client devices 10.

The combiner 7 may be configured to receive message data 13 associated with the content 11. The message data 13 may comprise one or more characters. As illustrated in this example, shown in FIG. 2, a Chinese character 美 is shown. It should be understood, that the message data 13 may comprise multiple characters, symbols, and/or like in one or more languages. For example, the message data 13 may comprise comments from users associated with the content 11.

The combiner 7 may be further configured to receive context information 15. The context information 15 may indicate a context for rendering the message data 13 associated with the content 11. The context information 15 may comprise timing information indicating a time to render the message data 13 with the content 11. The context information 15 may comprise a start time associated with the message data, a scrolling speed, a font size, a font color, an end time associated with the message data, and/or other relevant information.

The combiner 7 may be configured to combine the content 11 and the message data 13 to generate combined content 17 based on the context information 15. The combiner 7 may combine the content 11 and the message data 13 by generating a content package. The content package may comprise a container, such as a transport container (e.g., MPEG transport or other transport container), a formatted container (e.g., as specified for an encoding format). The content package may comprise instructions for a rendering engine to render the content 11 and the message data 13 at least partially together.

As shown in FIG. 2, the combiner 7 may combine the content 11 and the message data 13 by generating a modified video. For example, at least a portion of the message data may be added to the plurality of frames. The message data may be animated separately from the video and/or may be combined with (e.g., overlain, inserted into, added to, associated with, encoded into) frames of the video.

Using the content information, positions (e.g., relative to the plurality of frames) for the message data (e.g., characters) may be determined for one or more (or each) of the plurality of frames. A first position may be determined for a first frame 18. A second position may be determined for the second frame 19. The second position may be different than the first position. The second position may be determined based on the first position.

For example, a path for rendering characters of the message data may be determined. The path may specify a direction for animating and/or scrolling text above the content 11. The direction may vary. For example, the path may be curvilinear. The second position may be further along the path than the first position (e.g., if the second frame is after the first frame in the time ordering). If the path is from right to left, as shown in FIG. 2, then the second position may be further left than the first position. The combiner 7 may combine the content 11 and the message data 13 in a manner that the message data 13 is successively rendered along the path as the plurality of frames of the content progress.

Though only one character is shown, the combiner 7 may be configured to receive message data from a variety of sources at any time and combine the message data 13 with the content 11. For example, message data 13 from a plurality of users may be received and combined with the content 11. Different message data 13 may be combined in a manner that the message data 13 is rendered at least partially simultaneously.

For example, several messages from different users (e.g., another user may comment "日落" or sunset) may be rendered at least partially at the same time with the content 11. The message data may be combined in a manner that allows for the content 11 to remain viewable during rendering of the message data. For example, the message data may be combined with the content 11 using constraints that limit the number of messages shown simultaneously, limit the location of message data (e.g., shown in areas where pixels have less change, shown in background areas of the content), and/or the like as described further herein. As an example, the message data may be shown in a background, such as the sky behind a mountain in the example of FIG. 2. In other embodiments, the message data are not received as a series of messages, but rather the messages are combined and rendered by a separate service. In such an embodiment, the messages are not separately identifiable by the combiner 7 but rather are received as, e.g., a video overlay.

Figure 3:
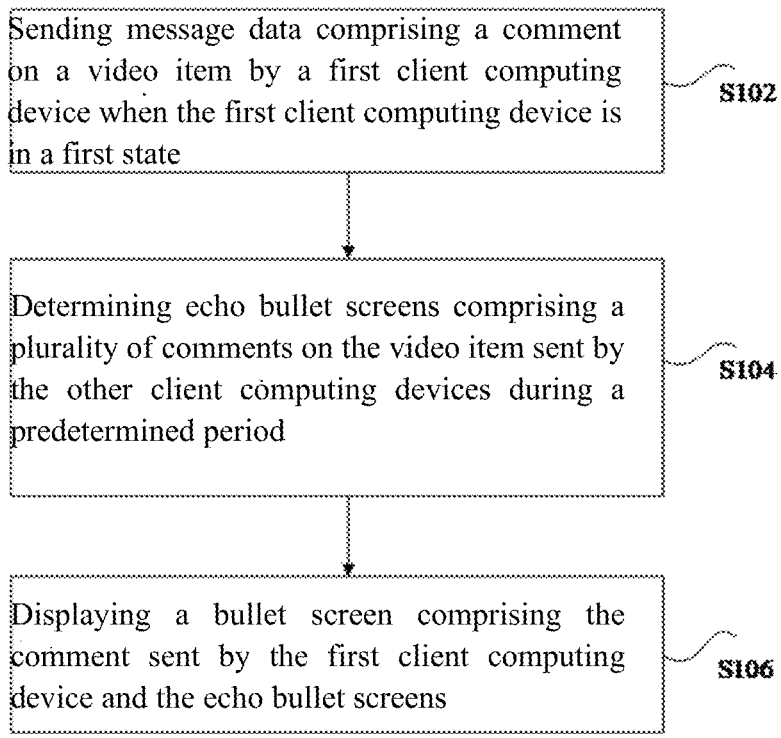
FIG. 3 is a flowchart illustrating an example process of presenting bullet screen in accordance with the present disclosure.

Please refer to FIG. 3 which is a flowchart illustrating an example process of displaying bullet screens in accordance with the present disclosure. In one embodiment, the display method of bullet screen echo includes following steps:

(1) sending message data comprising a comment on a video item by a first client computing device when the first client computing device is in a first state among a plurality of states;

(2) determining echo bullet screens comprising a plurality of comments on the video item sent by other client computing devices during a predetermined period from a time before sending the message data by the first client computing device to a time after sending the message data by the first client computing device;

(3) displaying a bullet screen comprising the comment on the video item by a first client computing device and the echo bullet screens.

Wherein, the certain period of time can be a period of time equal to the time before and after the time of sending the message data by the first client computing device, prefer 30 seconds each, and it may be set a short period of time which is after the time of sending the message data by the first client computing device only, such like 10 seconds after sending the message data. The echo bullet screens displayed in the same mode of the bullet screen comprising the comment sent by the first client computing device which may be referred to as "original bullet screen." Once the original bullet screen is displayed in scroll mode, the echo bullet screens are displayed in scroll mode too, when the original bullet screen is displayed in fixed mode, the echo bullet screens displayed in fixed mode too. Certainly, it is an alternative display mode that two kinds of bullet screens displayed in different modes.

In a preferred embodiment, the step (2) is in details as follows:

receiving bullet screen data comprising comments on the video item sent by the first client computing device and other client computing devices;

determining echo bullet screens using the received bullet screen data, wherein the echo bullet screens comprise a plurality of comments on the video item sent by the other client computing devices during the predetermined period, and wherein the predetermined period is associated with the time of sending the message data by the first client computing device; and determining one or more bullet screens among the echo bullet screens having similar semantic meanings with the original bullet screen as empathetic bullet screens;

and the step (3) is in details as follows:

displaying the original bullet screen and the empathetic bullet screens.

Wherein, the step of determining one or more bullet screens among the echo bullet screens having similar semantic meanings with the original bullet screen as empathetic bullet screens further comprises:

comparing the semantic meanings of each echo bullet screen with the original bullet screen, determine the empathetic bullet screens with similar semantic meaning of the original bullet screen.

The embodiment of only displaying the empathetic bullet screens can further deepen users' empathy.

In a further preferred embodiment, the step (3) is in details as follows:

displaying the original bullet screen, the empathetic bullet screens and other echo bullet screens.

In another further preferred embodiment, the empathetic bullet screens and other echo bullet screens can be displayed in different ways. Specifically, the transparency of empathetic bullet screens is lower than the transparency of other echo bullet screens. Therefore, the empathetic bullet screens are more obvious, while other echo bullet screens are lighter in color.

In a further preferred embodiment, the transparency of the other echo bullet screens and/or the empathetic bullet screens changes from low to high, in other words, the color of these bullet screens changes from dark to light.

In another further preferred embodiment, the display method of bullet screen echo further includes the following initialization step:

(0) in the video player, turn on the function of echo bullet screen, choose a video item, load the bullet screen database, start to play the video item.

This invention also discloses a system of displaying echo bullet screens, a device of displaying echo bullet screens and a computer-readable storage medium for implementing the above methods.

The system of displaying echo bullet screens includes the display device of bullet screen echo, and also includes a server link the device. The storage is the computer-readable storage medium, on which a computer program is stored, wherein the display methods of bullet screen echo mentioned above is carried out when the computer program is executed by the processor. The server stores and sends the videos and bullet screen database to the device.

Figure 4:
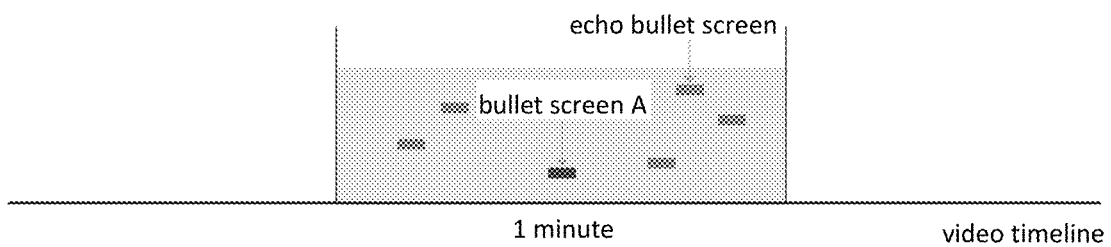
FIG. 4 is a schematic diagram illustrating example echo bullet screen in accordance with the present disclosure.

In the practical application, the method of displaying echo bullet screens of this disclosure realizes a middle state between turning on and off the bullet screen function. FIG. 4 is a schematic diagram of this disclosed method which is neither a state of the bullet screen function being turned on, nor a state of the function being turned off. When the echo bullet screen function is turned on, there is no bullet screen displayed, but a user can input a comment on the video. After the user sending a comment actively, during a period of time when the comment of the user is displayed on a display screen, other bullet screens having similar meanings with the user's comment and other echo bullet screens will be displayed on the display screen. This method can satisfy the user desire to feel empathy while the use do not need to see other irrelevant bullet screens.

The specific realization of the method of displaying echo bullet screens is illustrated by the following embodiments.

Embodiment 1

Figure 5:
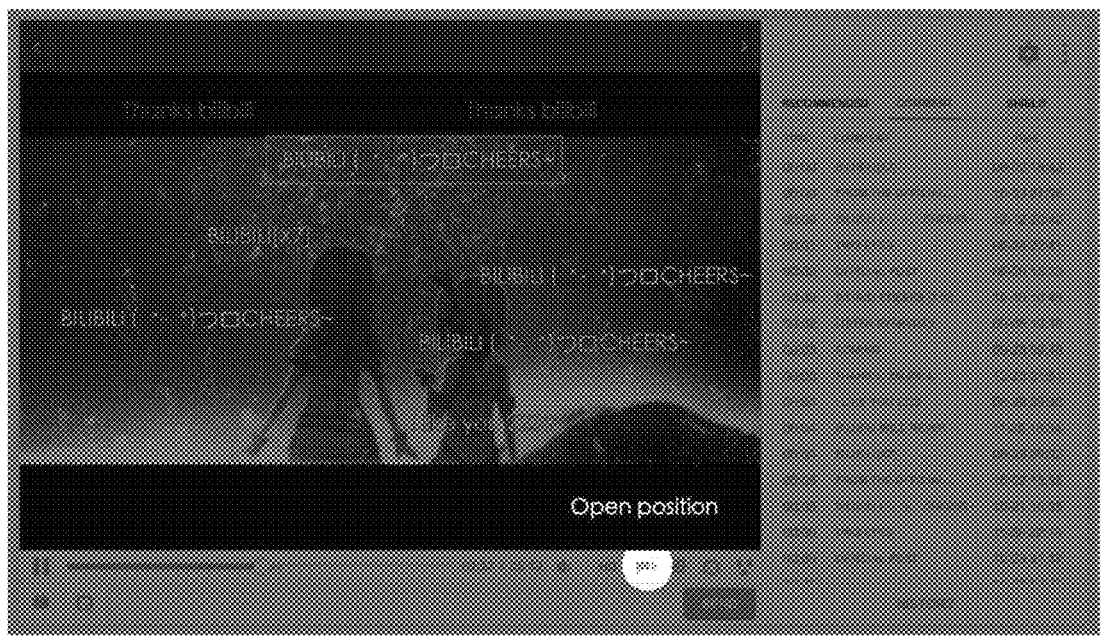
FIG. 5 is an example interface diagram illustrating a position of a switch for echo bullet screen function in accordance with the present disclosure.

When a user watches a video, the setting of echo bullet screen is turned on. An example switch of the echo bullet screen function is illustrated in FIG. 5. The example switch may be located at the same or similar position of the on/off bullet screen switch. The example echo bullet screen switch may share the same function level as the on/off bullet screen switch for switching between displaying all bullet screens and displaying none of bullet screens.

After the echo bullet screen function is turned on, the computer is in a state of no bullet screen when no comment is sent by the user; however, the user can input his or her comments to the computer, which will trigger to display some selected bullet screens, such as the echo bullet screens and the original bullet screen.

The bullet screens can be set displayed in scroll mode or fixed mode. Define the bullet screen sent by the user as bullet screen A (original bullet screen). After the bullet screen A is sent, the front-end traverses the bullet screens sent within 30 seconds before and after the bullet screen A is sent, selects the bullet screens (empathetic bullet screens) having the same semantic meaning as the bullet screen A. The empathetic bullet screens are displayed in 0% transparency. Other bullet screens (other echo bullet screens) within 30 seconds before and after sending the bullet screen A are displayed in 70% transparency. The echo bullet screen function has default effects (such as transparency effect, fade effect, etc), it also can be customized when the echo bullet screen function is turned on.

Through this method, users can only see the bullet screens when they send a comment actively, and can read the bullet screens have similar meaning to which they send, so as to feel empathy but not be disturbed by other bullet screens.

Embodiment 2

Figure 6:
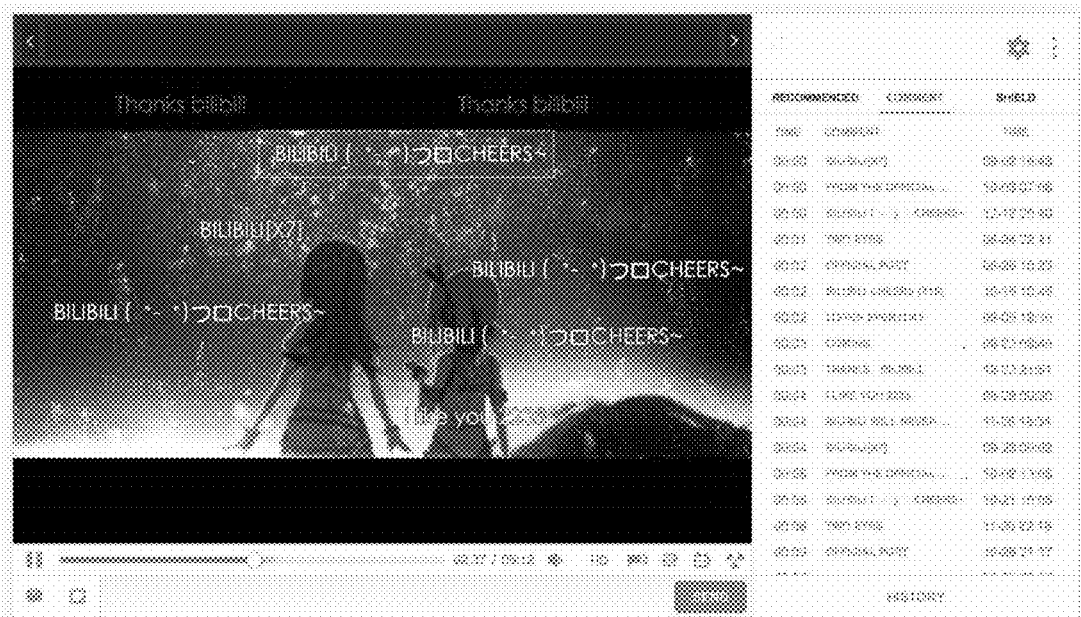
FIG. 6 is an example interface diagram illustrating an original bullet screen and its echo bullet screens in accordance with the present disclosure.

As illustrated in FIG. 6, a user sends a comment "Bilibili (°-°) ㄅㄇ cheers~" included in the original bullet screen that is shown in a frame. The bullet screens comprising comments sent during a period from 30 seconds before the time of sending this comment by the user and 30 seconds after the time of sending this comment by the user (video timeline) are determined as echo bullet screens. Among the echo bullet screens, by using regular expression/semantic analysis, when a semantic similarity or a text similarity between an echo bullet screen and the original bullet screen is equal to or greater than 80%, the echo bullet screen is determined as a synonymous bullet screen. The synonymous bullet screens are displayed with a transparency value of 0%, and the other echo bullet screens during the period are displayed with a transparency value of 70%.

In accordance with the present disclosure, whether or not display bullet screen(s) is controlled and triggered by a user. In response to sending a comment on a video sent by this user, bullet screens comprising comments sent by other users during a predetermined period associated with the time of sending the comment by this user are determined as echo bullet screens. Only the screen bullet comprising the comment sent by this user and the echo bullet screens are displayed to this user. In a further embodiment, among the echo bullet screens, some bullet screens can be further determined as synonymous bullet screens by comparing each echo bullet screen with the original bullet screen comprising the comment from this user. Determining and displaying echo bullet screens or even only synonymous bullet screens enables users to control displaying bullet screens, allow them to watch some bullet screens that they are interested in while closing other irrelevant bullet screens. The present disclosure improves user experience and simplifies users' control of displaying bullet screens.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general-purpose or special-purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages—such as Ruby, Perl, Python, C, C++, and the like—or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 7:
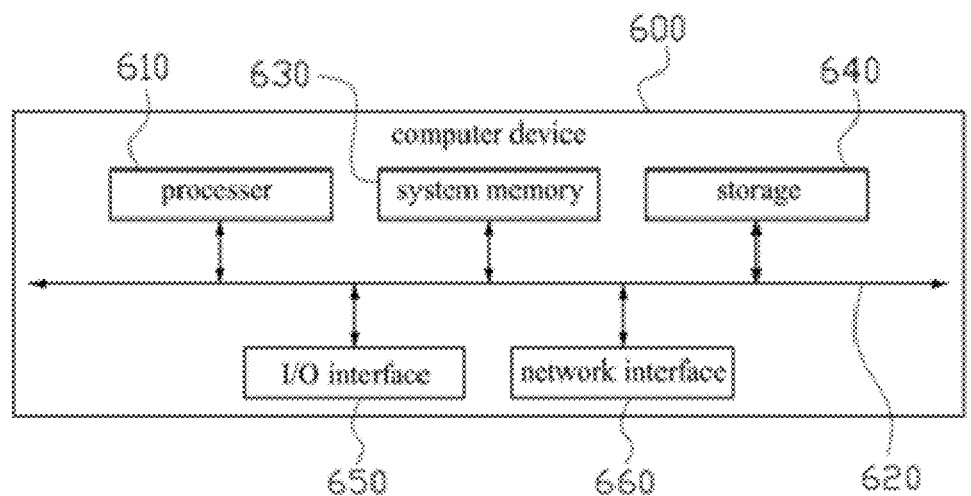
FIG. 7 is a schematic diagram illustrating an example computing device that may be used in accordance with the present disclosure.

In at least some embodiments, a server or computing device that implements a portion or all of one or more of the technologies described herein may include a general-purpose computer system that includes or is configured to access one or more computer-accessible media. FIG. 7 illustrates such a general-purpose computing device 600. In the illustrated embodiment, computing device 600 includes one or more processors 610 (which may be referred herein singularly as "a processor 610" or in the plural as "the processors 610") are coupled through a bus 620 to a system memory 630. Computing device 600 further includes a permanent storage 640, an input/output (I/O) interface 650, and a network interface 660.

In various embodiments, the computing device 600 may be a uniprocessor system including one processor 610 or a multiprocessor system including several processors 610 (e.g., two, four, eight, or another suitable number). Processors 610 may be any suitable processors capable of executing instructions. For example, in various embodiments, processors 610 may be general-purpose or embedded processors implementing any of a variety of instruction set architectures (ISAs), such as the x86, PowerPC, SPARC, or MIPS ISAs, or any other suitable ISA. In multiprocessor systems, each of processors 610 may commonly, but not necessarily, implement the same ISA.

System memory 630 may be configured to store instructions and data accessible by processor(s) 610. In various embodiments, system memory 630 may be implemented using any suitable memory technology, such as static random access memory (SRAM), synchronous dynamic RAM (SDRAM), nonvolatile/Flash-type memory, or any other type of memory.

In one embodiment, I/O interface 650 may be configured to coordinate I/O traffic between processor 610, system memory 630, and any peripheral devices in the device, including network interface 660 or other peripheral interfaces. In some embodiments, I/O interface 650 may perform any necessary protocol, timing, or other data transformations to convert data signals from one component (e.g., system memory 630) into a format suitable for use by another component (e.g., processor 610). In some embodiments, I/O interface 650 may include support for devices attached through various types of peripheral buses, such as a variant of the Peripheral Component Interconnect (PCI) bus standard or the Universal Serial Bus (USB) standard, for example. In some embodiments, the function of I/O interface 650 may be split into two or more separate components, such as a north bridge and a south bridge, for example. Also, in some embodiments some or all of the functionality of I/O interface 650, such as an interface to system memory 630, may be incorporated directly into processor 610.

Network interface 660 may be configured to allow data to be exchanged between computing device 600 and other device or devices attached to a network or network(s). In various embodiments, network interface 660 may support communication via any suitable wired or wireless general data networks, such as types of Ethernet networks, for example. Additionally, network interface 660 may support communication via telecommunications/telephony networks such as analog voice networks or digital fiber communications networks, via storage area networks such as Fibre Channel SANs or via any other suitable type of network and/or protocol.

In some embodiments, system memory 630 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 600 via I/O interface 650. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 600 as system memory 630 or another type of memory.

Further, a computer-accessible medium may include transmission media or signals such as electrical, electromagnetic or digital signals, conveyed via a communication medium such as a network and/or a wireless link, such as may be implemented via network interface 660. Portions or all of multiple computing devices may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices and is not limited to these types of devices.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from, or rearranged compared to the disclosed example embodiments.

It will also be appreciated that some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A method of displaying comments relative to video frames, comprising:
    sending message data by a first client computing device, wherein the message data comprise a comment on a video item and is sent by the first client computing device when the first client computing device is in a first state among a plurality of states, wherein the message data corresponds to an original bullet screen, wherein the plurality of states are associated with a function of displaying bullet screens, and the bullet screens are comments moving across video frames of the video item, wherein the plurality of states comprise the first state, a second state, and a third state, wherein the first state is a state in which display of the bullet screens on the first client computing device is triggered by sending the message data from the first client computing device, wherein the second state is a state in which no bullet screen is displayed, and wherein the third state is a state in which all bullet screens are displayed;
    receiving bullet screen data, wherein the bullet screen data comprise comments on the video item sent by the first client computing device and other client computing devices;
    determining echo bullet screens among the received bullet screen data based on a determination that a plurality of comments on the video item corresponding to the echo bullet screens were sent during a predetermined period associated with a time of sending the message data [comprising comment on video] by the first client computing device; and
    displaying the original bullet screen corresponding to the message data sent by the first client computing device and the echo bullet screens corresponding to the plurality of comments, wherein only the original bullet screen and the echo bullet screens are displayed on the first client computing device when the first client computing device is in the first state among the plurality of states.

2. The method of claim 1, further comprising:
    determining one or more bullet screens among the echo bullet screens by comparing a semantic meaning of the original bullet screen and a semantic meaning of each of the echo bullet screens corresponding to the plurality of comments, wherein the original bullet screen and the determined one or more bullet screens have similar semantic meanings.

3. The method of claim 2, wherein transparency values of the determined one or more bullet screens are lower than transparency values of other echo bullet screens.

4. The method of claim 2, wherein transparency values of at least the determined one or more bullet screens or other echo bullet screens change from a low value to a high value.

5. The method of claim 2, further comprising:
    displaying, by the first client computing device, the original bullet screen and the determined one or more bullet screens only.

6. The method of claim 1, wherein the predetermined period is from 30 seconds before the time of sending the message data by the first client computing device to 30 seconds after the time of sending the message data by the first client computing device.

7. A system of displaying comments relative to video frames, comprising:
    at least one processor; and
    at least one memory communicatively coupled to the at least one processor and storing instructions that upon execution by the at least one processor cause the system to:
    send message data by a first client computing device, wherein the message data comprise a comment on a video item and is sent by the first client computing device when the first client computing device is in a first state among a plurality of states, wherein the message data corresponds to an original bullet screen, wherein the plurality of states are associated with a function of displaying bullet screens, and the bullet screens are comments moving across video frames of the video item, wherein the plurality of states comprise the first state, a second state, and a third state, wherein the first state is a state in which display of the bullet screens on the first client computing device is triggered by sending the message data from the first client computing device, wherein the second state is a state in which no bullet screen is displayed, and wherein the third state is a state in which all bullet screens are displayed;

receive bullet screen data, wherein the bullet screen data comprise comments on the video item sent by the first client computing device and other client computing devices;

determine echo bullet screens among the received bullet screen data based on a determination that a plurality of comments on the video item corresponding to the echo bullet screens were sent during a predetermined period associated with a time of sending the message data by the first client computing device; and display the original bullet screen corresponding to the message data sent by the first client computing device and the echo bullet screens corresponding to the plurality of comments, wherein only the original bullet screen and the echo bullet screens are displayed on the first client computing device when the first client computing device is in the first state among the plurality of states.

8. The system of claim 7, the at least one memory further storing instructions that upon execution by the at least one processor cause the system to:

determine one or more bullet screens among the echo bullet screens by comparing a semantic meaning of the original bullet screen and a semantic meaning of each of the echo bullet screens corresponding to the plurality of comments, wherein the original bullet screen and the determined one or more bullet screens have similar semantic meanings.

9. The system of claim 8, wherein transparency values of the determined one or more bullet screens are lower than transparency values of other echo bullet screens.

10. The system of claim 8, wherein transparency values of at least the determined one or more bullet screens or other echo bullet screens change from a low value to a high value.

11. The system of claim 8, the at least one memory further storing instructions that upon execution by the at least one processor cause the system to:

display, by the first client computing device, the original bullet screen and the determined one or more bullet screens only.

12. The system of claim 7, wherein the predetermined period is from 30 seconds before the time of sending the message data by the first client computing device to 30 seconds after the time of sending the message data by the first client computing device.

13. A non-transitory computer-readable storage medium comprising computer-readable instructions that upon execution on a computing device cause the computing device at least to:

send message data by a first client computing device, wherein the message data comprise a comment on a video item and is sent by the first client computing device when the first client computing device is in a first state among a plurality of states, wherein the message data corresponds to an original bullet screen, wherein the plurality of states are associated with a function of displaying bullet screens, and the bullet screens are comments moving across video frames of the video item, wherein the plurality of states comprise the first state, a second state, and a third state, wherein the first state is a state in which display of the bullet screens on the first client computing device is triggered by sending the message data from the first client computing device, wherein the second state is a state in which no bullet screen is displayed, and wherein the third state is a state in which all bullet screens are displayed;

receive bullet screen data, wherein the bullet screen data comprise comments on the video item sent by the first client computing device and other client computing devices;

determine echo bullet screens among the received bullet screen data based on a determination that a plurality of comments on the video item corresponding to the echo bullet screens were sent during a predetermined period associated with a time of sending the message data by the first client computing device; and display the original bullet screen corresponding to the message data sent by the first client computing device and the echo bullet screens corresponding to the plurality of comments, wherein only the original bullet screen and the echo bullet screens are displayed on the first client computing device when the first client computing device is in the first state among the plurality of states.

14. The non-transitory computer-readable storage medium of claim 13, further comprising computer-readable instructions that upon execution on the computing device cause the computing device at least to:

determine one or more bullet screens among the echo bullet screens by comparing a semantic meaning of the original bullet screen and a semantic meaning of each of the echo bullet screens corresponding to the plurality of comments, wherein the original bullet screen and the determined one or more bullet screens have similar semantic meanings.

15. The non-transitory computer-readable storage medium of claim 14, wherein transparency values of the determined one or more bullet screens are lower than transparency values of other echo bullet screens.

16. The non-transitory computer-readable storage medium of claim 14, wherein transparency values of at least the determined one or more bullet screens or other echo bullet screens change from a low value to a high value.

17. The non-transitory computer-readable storage medium of claim 13, wherein the predetermined period is from 30 seconds before the time of sending the message data by the first client computing device to 30 seconds after the time of sending the message data by the first client computing device.

* * * * *